(12) United States Patent
Tamura et al.

(10) Patent No.: US 11,108,171 B2
(45) Date of Patent: Aug. 31, 2021

(54) TERMINAL, AND TERMINAL-ATTACHED CABLE AND WIRE HARNESS WITH THE TERMINAL

(71) Applicant: Yazaki Corporation, Tokyo (JP)

(72) Inventors: Nobuyuki Tamura, Shizuoka (JP); Shinobu Kayama, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/896,550

(22) Filed: Jun. 9, 2020

(65) Prior Publication Data

US 2020/0395688 A1   Dec. 17, 2020

(30) Foreign Application Priority Data

Jun. 11, 2019   (JP) .............................. JP2019-108756

(51) Int. Cl.
*H01R 4/20* (2006.01)
*H01R 4/58* (2006.01)
*H01R 13/03* (2006.01)

(52) U.S. Cl.
CPC ................ *H01R 4/20* (2013.01); *H01R 4/58* (2013.01); *H01R 13/03* (2013.01)

(58) Field of Classification Search
None
See application file for complete search history.

(56) References Cited

U.S. PATENT DOCUMENTS

| 9,136,628 B2* | 9/2015 | Aizawa ................... H01R 4/18 |
| 2016/0172069 A1* | 6/2016 | Sumiya ................ B32B 15/018 |
|  |  | 428/673 |
| 2018/0212350 A1 | 7/2018 | Tamura et al. |

FOREIGN PATENT DOCUMENTS

| EP | 0 552 741 A2 | 7/1993 |
| JP | 2009-079250 A | 4/2009 |
| JP | 2015-219975 A | 12/2015 |
| JP | 2016-056422 A | 4/2016 |

* cited by examiner

*Primary Examiner* — Ross N Gushi
(74) *Attorney, Agent, or Firm* — Sughrue Mion, PLLC (57) ABSTRACT

A terminal includes a connection part electrically connectable to a mating terminal, and a crimp part capable of crimping a cable. The connection part includes a first base having electrical conductivity, and a first plating layer that covers the first base, has a Vickers hardness of 250 Hv or more, and contains silver alloy containing silver. The crimp part includes a second base having electrical conductivity, and a second plating layer that covers the second base, has a Vickers hardness of less than 225 Hv, and contains either silver or silver alloy containing silver.

9 Claims, 5 Drawing Sheets

TERMINAL, AND TERMINAL-ATTACHED CABLE AND WIRE HARNESS WITH THE TERMINAL

CROSS-REFERENCE TO RELATED APPLICATIONS

The present application is based on, and claims priority from Japanese Patent Application No. 2019-108756, filed on Jun. 11, 2019, the entire contents of which are incorporated herein by reference.

TECHNICAL FIELD

The disclosure relates to a terminal, and a terminal-attached cable and wire harness with the terminal.

BACKGROUND

In recent years, demand for hybrid vehicles and electric vehicles has been increasing, and such vehicles are equipped with high-power motors, causing a large current to flow through terminals. However, tin plating that is typically applied to gasoline-powered vehicles tends to generate heat because of its high electrical resistance and is not so high in heat resistance, so that the heat may deteriorate the tin plating. Further, since the terminals are repeatedly mated and unmated, it is desired that the terminals be resistant to wear. Therefore, it has been proposed to use silver or silver alloy plating instead of tin plating for terminals used in hybrid vehicles and electric vehicles.

For example, in a member disclosed in JP 2009-79250 A, a silver or silver alloy layer containing 0.1 mass % or less of antimony is formed on at least a part of a surface of a copper or copper alloy member. A silver alloy layer having a Vickers hardness of 140 Hv or more is formed on the silver or silver alloy layer as an outermost layer.

Further, a terminal member disclosed in JP 2016-56422 A includes a base material formed of copper or copper alloy, a first layer formed of Ni or Ni alloy on the base material, and a second layer formed of a Cu—Sn alloy on the first layer. The terminal member further includes a third layer formed of Ag—Sn alloy on the second layer and a fourth layer exposed to an outermost surface and formed of Ag or Ag alloy on the third layer.

SUMMARY

However, in the member disclosed in JP 2009-79250 A, since the hardness of the silver or silver alloy layer is not so high, it is necessary to increase a layer thickness of the silver or silver alloy layer in order to withstand terminal mating and unmating. On the other hand, when the layer thickness is increased, a plating time increases accordingly, so it is necessary to increase a plating material to be used, which may increase the cost.

Further, in the terminal member disclosed in JP 2016-56422 A, since the Ag—Sn alloy easily cracks by bending work, the base material may be exposed when the terminal member crimps onto a cable. For this reason, the base material may be oxidized and corroded, which may lead to a reduction in electrical connection reliability and a reduction in the strength of a crimp part.

The disclosure has been made in view of such problems of the related art. The object of the disclosure is to provide a terminal excellent in mating and unmating performance and bending workability, and a terminal-attached cable and wire harness with the terminal.

A terminal according to a first aspect of the present invention includes a connection part electrically connectable to a mating terminal, and a crimp part capable of crimping a cable. The connection part includes a first base having electrical conductivity, and a first plating layer that covers the first base, has a Vickers hardness of 250 Hv or more, and contains silver alloy containing silver. The crimp part includes a second base having electrical conductivity, and a second plating layer that covers the second base, has a Vickers hardness of less than 225 Hv, and contains either silver or silver alloy containing silver.

A terminal according to a second aspect of the present invention relates to the terminal according to the first aspect, in which the silver alloy contained in the first plating layer is alloy containing silver and at least one metal selected from the group consisting of tin, copper, palladium, bismuth, indium, and antimony.

A terminal according to a third aspect of the present invention relates to the terminal according to the first or second aspect and further includes an underlayer that is arranged at least one between the first base and the first plating layer and between the second base and the second plating layer. The underlayer has a thickness of from more than 0 μm to 3 μm or less, and contains at least one metal selected from the group consisting of nickel, copper, and silver.

A terminal according to a fourth aspect of the present invention relates to the terminal according to any one of the first to third aspects, in which the connection part further includes a silver layer arranged on an outermost surface and formed of silver.

A terminal according to a fifth aspect of the present invention relates to the terminal according to any one of the first to fourth aspects, in which the crimp part includes no plating layer containing silver alloy containing silver and having a Vickers hardness of 250 Hv or more.

A terminal according to a sixth aspect of the present invention relates to the terminal according to any one of the first to fifth aspects, in which a part other than the connection part or the crimp part includes no plating layer formed of at least one of a material forming the first plating layer and a material forming the second plating layer.

A terminal-attached cable according to a seventh aspect of the present invention includes the terminal according to any one of the first to sixth aspects.

A wire harness according to an eighth aspect of the present invention includes the terminal-attached cable according to the seventh aspect.

According to the disclosure, the terminal excellent in mating and unmating performance and bending workability, and the terminal-attached cable and wire harness with the terminal can be provided.

DETAILED DESCRIPTION

A description will be given below of details of a terminal, and a terminal-attached cable and wire harness with the terminal with reference to the drawings. Note that dimensional ratios in the drawings are exaggerated for purposes of illustration and may differ from the actual ratios.

[Terminal]

Figure 1:
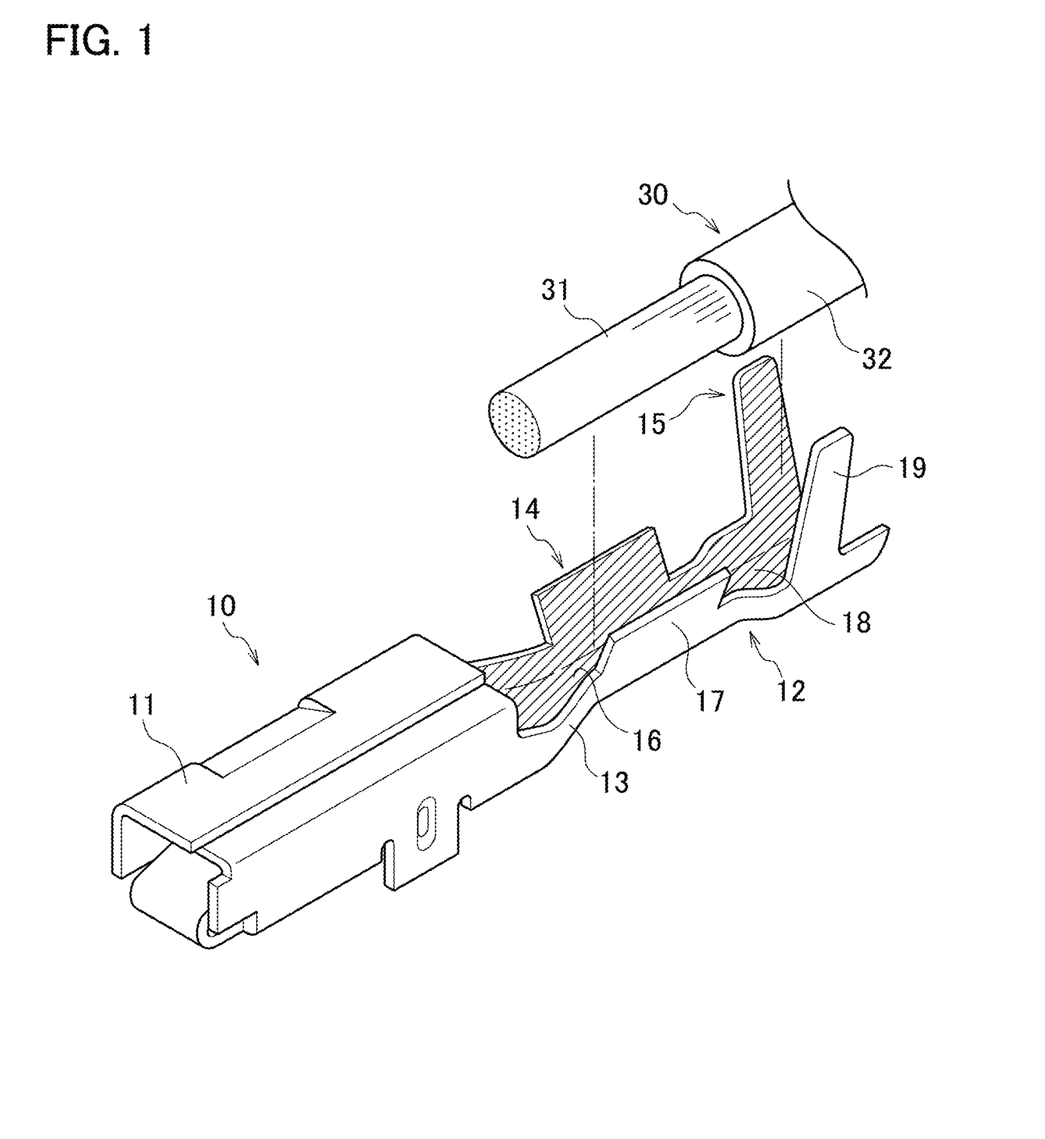
FIG. 1 is a perspective view illustrating an example of a terminal according to a present embodiment.

As illustrated in FIG. 1, a terminal 10 according to the present embodiment includes a connection part 11 and a crimp part 12. The connection part 11 is provided at one end of the terminal 10, and the crimp part 12 is provided at the other end of the terminal 10. Note that a description according to the present embodiment will be given of a female crimp terminal, but a male crimp terminal may be employed.

The connection part 11 is electrically connectable to a mating terminal. According to the present embodiment, the mating terminal (not illustrated) is a male crimp terminal. The connection part 11 of the female crimp terminal may be configured to allow, when connected to a connection part of the male terminal, a current to flow. According to the present embodiment, the connection part 11 has a box-like shape and includes a spring piece that engages with the mating terminal.

The crimp part 12 is capable of crimping a cable 30. For example, the crimp part 12 crimps a terminal part of the cable 30, thereby causing the crimp part 12 to connect to the cable 30. The crimp part 12 includes a conductor crimp part 14 for crimping a conductor 31 of the cable 30 and a sheath crimp part 15 for crimping a cable sheath 32 of the cable 30.

The conductor crimp part 14 is configured to come into direct contact with the conductor 31 exposed by removal of the cable sheath 32 at the terminal part of the cable 30, and includes a bottom plate 16 and a pair of conductor crimp pieces 17. The pair of conductor crimp pieces 17 extend upward from both side edges of the bottom plate 16. The pair of conductor crimp pieces 17 are bent inward so as to cover the conductor 31 of the cable 30, thereby allowing the conductor 31 to be crimped so as to be in close contact with an upper surface of the bottom plate 16. The conductor crimp part 14 is formed by the bottom plate 16 and the pair of conductor crimp pieces 17 into an approximately U-shape in cross section.

The sheath crimp part 15 is configured to come into direct contact with the cable sheath 32 at the terminal part of the cable 30 and includes a bottom plate 18 and a pair of sheath crimp pieces 19. The pair of sheath crimp pieces 19 extend upward from both side edges of the bottom plate 18. The pair of sheath crimp pieces 19 are bent inward so as to cover a part with the cable sheath 32, thereby allowing the cable sheath 32 to be crimped so as to be in close contact with an upper surface of the bottom plate 18. The sheath crimp part 15 is formed by the bottom plate 18 and the pair of sheath crimp pieces 19 into an approximately U-shape in cross section. Note that the bottom plate 16 of the conductor crimp part 14 and the bottom plate 18 of the sheath crimp part 15 forms a common continuous bottom plate.

The terminal 10 may include an intermediate part 13 that connects the connection part 11 and the crimp part 12. According to the present embodiment, the terminal 10 is formed by the connection part 11, the crimp part 12, and the intermediate part 13 that are integrally connected. However, the terminal 10 may be formed by a combination of different components of the connection part 11, the crimp part 12, and the intermediate part 13.

Figure 2:
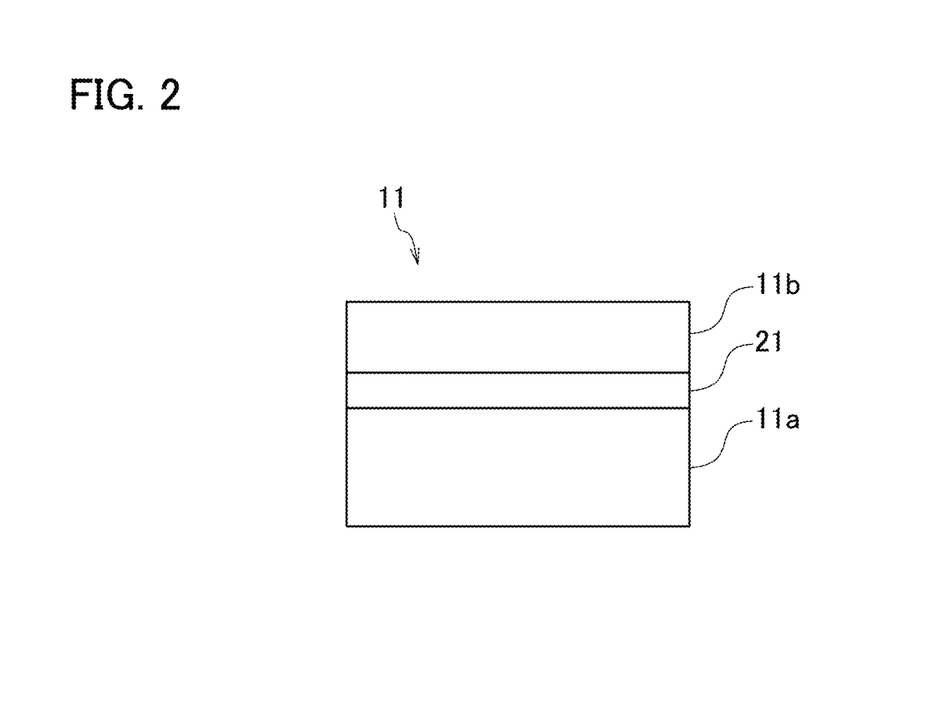
FIG. 2 is a partially enlarged cross-sectional view of a connection part according to the embodiment.

As illustrated in FIG. 2, the connection part 11 includes a first base 11a and a first plating layer 11b. The first plating layer 11b covers the first base 11a. Specifically, the first plating layer 11b may directly cover a surface of the first base 11a or indirectly cover the surface of the first base 11a with a first intermediate layer interposed between the first plating layer 11b and the first base 11a. That is, the first plating layer 11b may directly cover the surface of the first base 11a or indirectly cover the surface of the first base 11a with the first intermediate layer. The first intermediate layer may be, for example, an underlayer 21 to be described later, a second plating layer 12b to be described later, or the like. Further, the first plating layer 11b only needs to cover at least some of the surface of the first base 11a; thus, the first plating layer 11b may cover either a part or all of the surface of the first base 11a.

Further, another plating layer (not illustrated) may be arranged on the first plating layer 11b opposite to the first base 11a, or, as illustrated in FIG. 2, the first plating layer 11b may be provided on an outermost surface of the connection part 11. The other plating layer (not illustrated) may contain metal containing silver. Note that it is preferable that the connection part 11 further include a silver layer arranged on the outermost surface and formed of silver. Since the silver layer is arranged on the outermost surface of the connection part 11, electrical resistance of the outermost surface of the connection part 11 tends to be reduced, which makes it possible to increase electrical conductivity with the mating terminal and increase electrical connection reliability of the terminal 10. The silver layer may be the other plating layer described above. Further, in FIG. 2, the first plating layer 11b is arranged only on one surface of the first base 11a, but the first plating layer 11b may be arranged on both surfaces of the first base 11a.

The first base 11a has electrical conductivity. The first base 11a contains at least one metal selected from the group consisting of, for example, copper, copper alloy, aluminum, aluminum alloy, iron, iron alloy, magnesium, and magnesium alloy.

The first plating layer 11b has a Vickers hardness of 250 Hv or more. Therefore, even when the terminal 10 is repeatedly mated and unmated, the surface of the connection part 11 hardly wears. This in turn makes it possible to reduce a layer thickness of the first plating layer 11b; therefore, reductions in volume of a plating material and in plating time allow productivity of the terminal 10 to increase. For example, preparing a composition of a plating bath for forming the first plating layer 11b and adjusting the current density when forming the first plating layer 11b makes it possible to change the Vickers hardness of the first plating layer 11b. Note that the Vickers hardness can be measured herein in accordance with Japanese Industrial Standard JIS Z2244:2009 (Vickers hardness test-Test method). Further, the measurement can be performed with a test temperature of 25° C. and a test force of 3 gf.

The first plating layer 11b contains silver alloy containing silver. The silver alloy contained in the first plating layer 11b is preferably alloy containing silver and at least one metal selected from the group consisting of tin (Sn), copper (Cu), palladium (Pd), bismuth (Bi), indium (In), and antimony (Sb). Such silver alloy are preferable because they are higher in Vickers hardness than pure silver and hardly wear even when the terminal 10 is repeatedly mated and unmated. The silver alloys may be a binary alloy containing a binary metal or a ternary alloy containing a ternary metal. Further, the silver alloy may be alloy containing quaternary or more metal.

The content of at least one metal selected from the group consisting of tin (Sn), copper (Cu), palladium (Pd), bismuth (Bi), indium (In), and antimony (Sb) contained in the first plating layer 11b is not limited to a particular content as long as the Vickers hardness is equal to or more than 250 Hv, but is preferably in a range of from 5 mass % to 50 mass %, and more preferably in a range of from 10 mass % to 40 mass %. When the first plating layer 11b is alloy containing silver and tin, the content of tin contained in the first plating layer 11b is preferably, for example, in a range of from 18 mass % or more to less than 32 mass %. Further, the content of silver contained in the first plating layer 11b is preferably equal to or more than 40 mass %, and more preferably equal to or more than 50 mass %. Note that, herein, the composition of the plating layer can be measured with a scanning electron microscope (SEM)—energy dispersive X-ray spectroscopy (EDX).

The thickness of the first plating layer 11b is preferably equal to or more than 0.1 μm, and more preferably equal to or more than 1 μm, from the viewpoint of corrosion protection. Further, the thickness of the first plating layer 11b is preferably equal to or less than 30 μm, and more preferably equal to or less than 20 μm, from the viewpoint of productivity and cost reduction.

It is possible to form the first plating layer 11b by preparing an alloy plating bath that is a mixture of a metal salt such as a tin salt and a silver plating bath and immersing the first base 11a in the alloy plating bath to add a plating to the first base 11a. The plating treatment is preferably made by the constant current electrolysis because a film thickness can be easily adjusted.

The silver alloy plating bath used to form the first plating layer 11b may contain, for example, a silver salt, a metal salt, an electric conducting salt, or the like. The silver salt contains at least one salt selected from the group consisting of, for example, silver cyanide, silver iodide, silver oxide, silver sulfate, silver nitrate, silver methanesulfonate, and silver chloride. Further, the electric conducting salt contains at least one salt selected from the group consisting of potassium cyanide, sodium cyanide, potassium pyrophosphate, silver methanesulfonate, potassium iodide, and sodium thiosulfate. Silver ion concentration in the plating bath is preferably in a range of from 30 g/L to 50 g/L, for example.

The metal salt preferably includes the salt containing at least one metal selected from the group consisting of, for example, tin (Sn), copper (Cu), palladium (Pd), bismuth (Bi), indium (In) and antimony (Sb) described above.

When a tin salt is used as the metal salt, the tin salt contains at least one salt selected from the group consisting of, for example, a stannous salts such as stannous organic sulfonate, e.g., stannous methanesulfonate, stannous pyrophosphate, stannous chloride, stannous sulfate, and stannous acetate, stannous sulfamate, stannous gluconate, stannous tartrate, stannous oxide, stannous borofluoride, stannous succinate, stannous lactate, stannous citrate, stannous phosphate, stannous iodide, stannous formate, and stannous fluorosilicate, and a stannic salts such as sodium stannate and potassium stannate. Tin ion concentration in the plating bath is preferably in a range of from 2 g/L to 10 g/L, for example.

The current density applied when the first plating layer 11b is formed by electrolytic plating may be set with consideration given to various factors such as productivity, plating bath composition, ion concentration, and the shape of an object to be plated. The current density is preferably in a range of from 0.1 A/dm$^2$ to 20 A/dm$^2$, for example. The higher the current density is, the shorter the plating time becomes, but the surface of the first plating layer 11b tends to be rough; therefore, it is desirable to appropriately make an adjustment so as to ensure desired plating. A plating bath temperature when the first plating layer 11b is formed by electrolytic plating is not limited to a particular temperature, but is preferably in a range of from 20° C. to 45° C.

Figure 3:
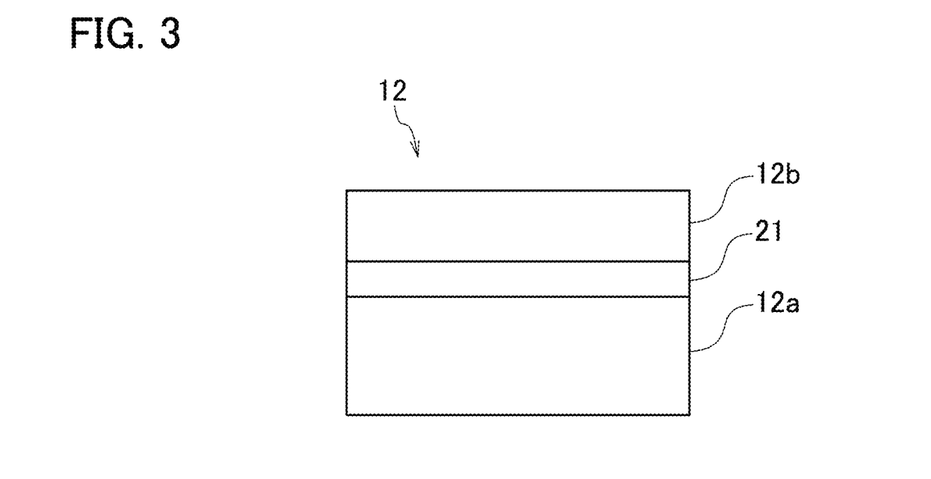
FIG. 3 is a partially enlarged cross-sectional view of a crimp part according to the embodiment.

As illustrated in FIG. 3, the crimp part 12 include a second base 12a and the second plating layer 12b. The second plating layer 12b covers the second base 12a. Specifically, the second plating layer 12b may directly cover a surface of the second base 12a or indirectly cover the surface of the second base 12a with a second intermediate layer interposed between the second plating layer 12b and the second base 12a. That is, the second plating layer 12b may directly cover the surface of the second base 12a or indirectly cover the surface of the second base 12a with the second intermediate layer. The second intermediate layer may be, for example, the underlayer 21 to be described later, the first plating layer 11b, or the like. Further, the second plating layer 12b only needs to cover at least some of the surface of the second base 12a; thus, the second plating layer 12b may cover either a part or all of the surface of the second base 12a.

Further, another plating layer (not illustrated) may be arranged on the second plating layer 12b opposite to the second base 12a, or, as illustrated in FIG. 3, the second plating layer 12b may be provided on an outermost surface of the crimp part 12. The other plating layer (not illustrated) may contain metal including silver. Further, in FIG. 3, the second plating layer 12b is arranged only on one surface of the second base 12a, but the second plating layer 12b may be arranged on both surfaces of the second base 12a.

The second base 12a has electrical conductivity. The second base 12a contains at least one metal selected from the group consisting of, for example, copper, copper alloy, aluminum, aluminum alloy, iron, iron alloy, magnesium, and magnesium alloy.

The second plating layer 12b has a Vickers hardness of less than 225 Hv. Therefore, even when the crimp part 12 crimps the cable 30, the second plating layer 12b hardly cracks, and the second base 12a is hardly exposed. This in turn makes it possible to make the second base 12a resistant to oxidation and corrosion and suppress a reduction in electrical connection reliability and a reduction in strength of the crimp part 12. For example, preparing a composition of a plating bath for forming the second plating layer 12b and adjusting the current density when forming the second plating layer 12b makes it possible to change the Vickers hardness of the second plating layer 12b.

Figure 4:
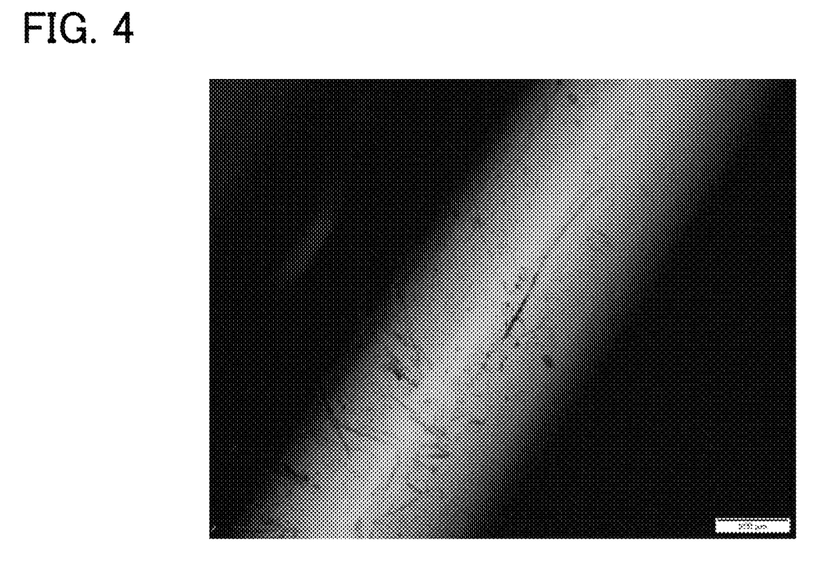
FIG. 4 is a photograph taken with a scanning electron microscope (SEM), illustrating the appearance of the crimp part having no cracks on its outer surface.
Figure 5:
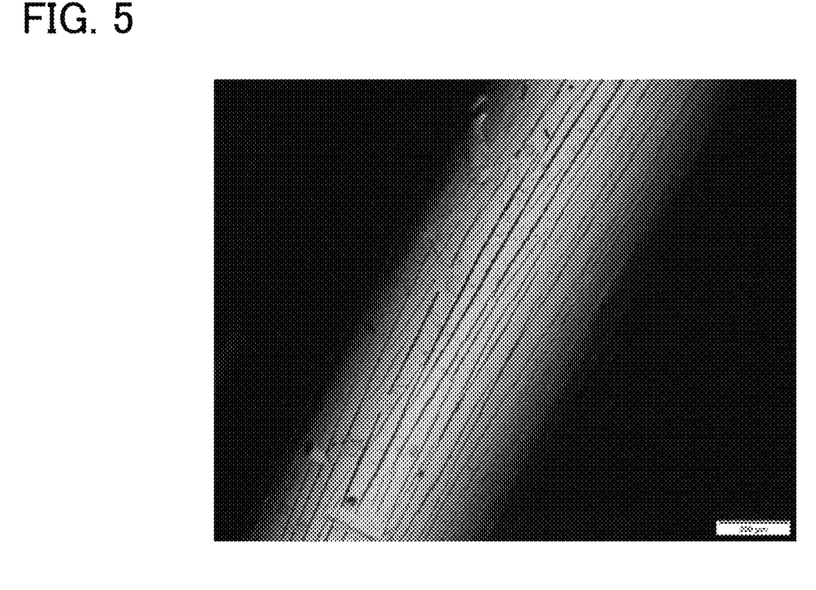
FIG. 5 is a photograph taken with the SEM, illustrating the appearance of the crimp part having cracks on its outer surface.

FIG. 4 and FIG. 5 illustrate observation results, obtained with a metallographic microscope, of the outer surface of the crimp part after the terminal crimps the cable. As illustrated in FIG. 4, when a plating layer having a Vickers hardness of less than 225 Hv is formed on the outer surface of the crimp part, cracks are less likely to appear on the outer surface of the crimp part even when the crimp part crimps the cable. On the other hand, as illustrated in FIG. 5, when a plating layer having a Vickers hardness of 225 Hv or more is formed on the outer surface of the crimp part, a plurality of cracks may appear on the outer surface of the crimp part when the crimp part crimps the cable.

The second plating layer 12b contains either silver or silver alloy containing silver. As described above, the use of a material that is low in electrical resistance makes it possible to reduce heat generated by a current flowing through the crimp part 12.

When the second plating layer 12b is formed of silver alloy, the silver alloy may contain antimony. The content of antimony contained in the silver alloy forming the second plating layer 12b is not limited to a particular content as long as the Vickers hardness is less than 225 Hv, but is preferably, for example, equal to or less than 2 mass %. Further, the content of silver contained in the second plating layer 12b is preferably equal to or more than 98 mass %.

The crimp part 12 preferably includes no plating layer containing silver alloy containing silver and having a Vickers hardness of 250 Hv or more. This is because, without such a plating layer, cracks are less likely to appear on the plating layer when the crimp part 12 crimps the cable 30.

A thickness of the second plating layer 12b is preferably equal to or more than 0.1 µm, and more preferably equal to or more than 1 µm, from the viewpoint of corrosion protection. Further, the thickness of the second plating layer 12b is preferably equal to or less than 30 µm, more preferably equal to or less than 20 µm, and still more preferably equal to or less than 10 µm, from the viewpoint of productivity and cost reduction.

(Underlayer 21)

As illustrated in FIG. 2 and FIG. 3, the terminal 10 may further include the underlayer 21 in order to provide various functions. The underlayer 21 may be formed of a single layer or a plurality of layers. According to the present embodiment, the underlayer 21 is arranged at least one between the first base 11a and the first plating layer 11b and between the second base 12a and the second plating layer 12b. For example, in FIG. 2, the underlayer 21 is arranged between the first base 11a and the first plating layer 11b. That is, the connection part 11 includes the first base 11a, the first plating layer 11b, and the underlayer 21. In FIG. 3, the underlayer 21 is arranged between the second base 12a and the second plating layer 12b. That is, the crimp part 12 includes the second base 12a, the second plating layer 12b, and the underlayer 21. The underlayer 21 preferably has a thickness of from more than 0 µm to 3 µm or less, for example.

The underlayer 21 preferably contains at least one metal selected from the group consisting of nickel, copper, and silver. Specifically, the underlayer 21 preferably contains at least one metal selected from the group consisting of nickel, nickel alloy, copper, copper alloy, silver, and silver alloy.

When the underlayer 21 contains nickel or nickel alloy, it is possible to prevent, for example, metal atoms contained in the first base 11a or the second base 12a from moving and diffusing to the first plating layer 11b or the second plating layer 12b. That is, the underlayer 21 acts as a barrier layer. A layer thickness of the underlayer 21 when the underlayer 21 contains either nickel or nickel alloy is not limited to a particular thickness as long as the underlayer 21 acts as a barrier layer, but is preferably in a range of from 0.1 µm to 3 µm both inclusive.

When the underlayer 21 contains at least one metal selected from the group consisting of copper, copper alloy, silver, and silver alloy, it is possible to increase adhesion between the first base 11a and the first plating layer 11b or between the second base 12a and the second plating layer 12b. The layer thickness of the underlayer 21 in a case where the underlayer 21 contains at least one metal selected from the group consisting of copper, copper alloy, silver, and silver alloy is not limited to a particular thickness as long as the adhesion is increased, and it is possible to increase the adhesion even with the layer thickness being very small. Therefore, the layer thickness in this case is preferably, for example, in a range of from more than 0 µm to 3 µm or less.

The underlayer 21 may be formed of a single layer or a plurality of layers. For example, the underlayer 21 may include a lower layer and an upper layer arranged on the lower layer. Then, for example, the lower layer may contain either nickel or nickel alloy, and the upper layer may contain at least one metal selected from the group consisting of copper, copper alloy, silver, and silver alloy. The combination of these layers can be appropriately changed according to its purpose.

A method for forming the underlayer 21 is not limited to a particular method, and, for example, a known plating method can be used in which a material to be plated of at least one of the first base 11a and the second base 12a is put in a plating bath and then plated.

In the terminal 10, a part other than the connection part 11 or the crimp part 12 includes no plating layer formed of at least one of the material forming the first plating layer 11b and the material forming the second plating layer 12b. This makes it possible to reduce the amount of material used for the first plating layer 11b or the second plating layer 12b.

Figure 6:
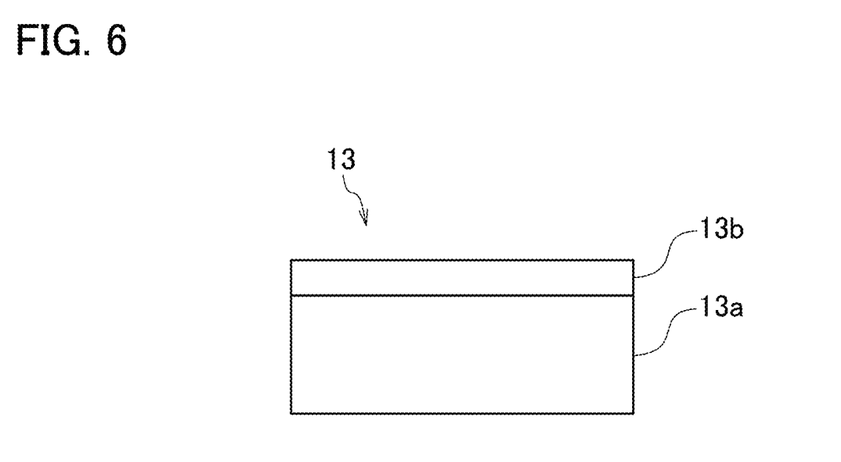
FIG. 6 is a partially enlarged cross-sectional view of an intermediate part according to the embodiment.

The part other than the connection part 11 or the crimp part 12 is, for example, the intermediate part 13 that connects the connection part 11 and the crimp part 12. According to the present embodiment, the intermediate part 13 is a part that is not directly involved in the connection with the mating terminal and the crimping onto the cable. Although a layer structure of the intermediate part 13 is not limited to a particular structure, and, as illustrated in FIG. 6, the intermediate part 13 may include a third base 13a having electrical conductivity and a third plating layer 13b covering the third base 13a. The material forming the first plating layer 11b herein is a material that contains silver alloy and has a Vickers hardness of 250 Hv or more when the plating layer is formed. Further, the material forming the second plating layer 12b herein is a material that contains either silver or silver alloy and has a Vickers hardness of less than 225 Hv when the plating layer is formed. In FIG. 6, the third plating layer 13b is arranged only on one surface of the third base 13a, but the third plating layer 13b may be arranged on both surfaces of the third base 13a.

The third base 13a has electrical conductivity. The third base 13a contains at least one metal selected from the group consisting of, for example, copper, copper alloy, aluminum, aluminum alloy, iron, iron alloy, magnesium, and magnesium alloy.

The third plating layer 13b may contain at least one metal selected from the group consisting of, for example, silver, tin, copper, and nickel. From the viewpoint of cost reduction, the third plating layer 13b preferably contains at least one metal selected from the group consisting of tin, copper, and nickel.

The first base 11a, the second base 12a, and the third base 13a may be formed of different materials, or may be formed of the same material to be an integrally molded base. For example, the bases may be formed of the same material by, for example, cutting a single metal plate and subjecting the metal plate to bending work.

Further, as described above, the plating layer can be formed by a known method, but the order of plating is not limited to a particular order. For example, when the base is formed of a single metal plate as described above, after the metal plate that is plated to form the underlayer 21 is manufactured, the plate may be entirely plated to form the second plating layer 12b. Then, after the first plating layer 11b is formed only on a part of the plate entirely covered by the second plating layer 12b where the connection part 11 is formed, the plate may be bent or the like to form the terminal 10. At this time, the underlayer 21 need not be plated and may be formed of a plurality of different layers.

Further, after the plate that is entirely plated to form the underlayer 21 is manufactured, the first plating layer 11b may be formed only on the part where the connection part 11 is formed, and the second plating layer 12b may be formed only on the part where the crimp part 12 is formed. At this time, the intermediate part 13 where neither the first plating layer 11b nor the second plating layer 12b is formed may be provided. Further, as described above, the underlayer 21 need not be plated and may be formed of a plurality of different layers.

As described above, the terminal 10 according to the present embodiment includes the connection part 11 electrically connectable to the mating terminal and the crimp part 12 capable of crimping the cable 30. The connection part 11 includes the first base 11a having electrical conductivity and the first plating layer 11b that covers the first base 11a, has a Vickers hardness of 250 Hv or more, and contains silver alloy containing silver. The crimp part 12 includes the second base 12a having electrical conductivity, and the second plating layer 12b that covers the second base 12a, has a Vickers hardness of less than 225 Hv, and contains either silver or silver alloy containing silver.

Therefore, even when the terminal 10 is repeatedly mated and unmated, the surface of the connection part 11 hardly wears, and the layer thickness of the first plating layer 11b can be reduced accordingly, so that reductions in volume of a plating material and in plating time allow productivity of the terminal 10 to increase. Further, even when the crimp part 12 crimps the cable 30, the second plating layer 12b hardly cracks, and the second base 12a is hardly exposed, so that it is possible to make the second base 12a resistant to oxidation and corrosion and suppress a reduction in electrical connection reliability and a reduction in strength of the crimp part 12. Therefore, the terminal 10 according to the present embodiment is excellent in mating and unmating performance and bending workability.

[Terminal-Attached Cable]

Figure 7:
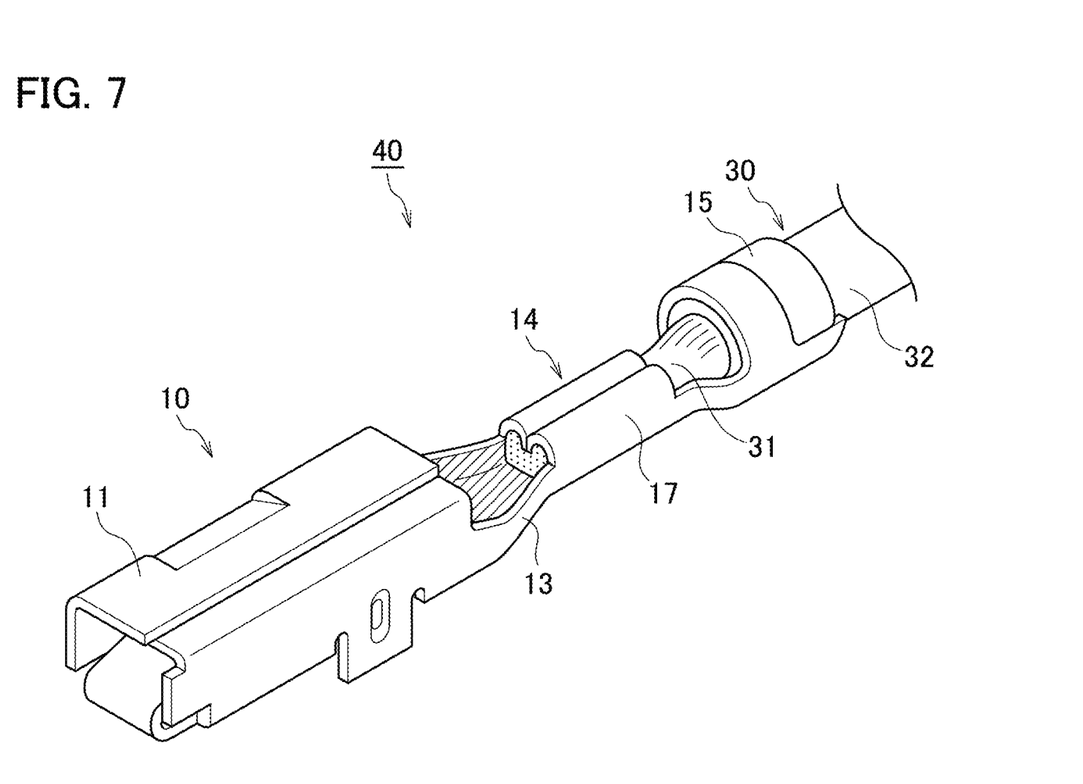
FIG. 7 is a perspective view illustrating an example of a terminal-attached cable according to the present embodiment.

As illustrated in FIG. 7, a terminal-attached cable 40 according to the present embodiment includes the terminal 10. As described above, since the terminal 10 is excellent in mating and unmating performance and bending workability, the terminal-attached cable 40 according to the present embodiment is suitably applicable to any places such as hybrid vehicles and electric vehicles. The terminal-attached cable 40 includes the terminal 10 and the cable 30 crimped by the crimp part 12 of the terminal 10. Specifically, the conductor crimp part 14 of the crimp part 12 crimps the conductor 31 of the cable 30, and the sheath crimp part 15 of the crimp part 12 crimps the cable sheath 32 of the cable 30.

As a material of the conductor 31, a metal having high electrical conductivity may be used. As the material of the conductor 31, for example, copper, copper alloy, aluminum, aluminum alloy, or the like may be used. In recent years, there is a demand for reducing the weight of the cable 30. Therefore, the conductor 31 is preferably formed of lightweight aluminum or aluminum alloy.

As a material of the cable sheath 32 that covers the conductor 31, a resin capable of securing electrical insulation may be used. As the material of the cable sheath 32, for example, an olefin-based resin may be used. Specifically, the material of the cable sheath 32 may contain, as a main component, at least one resin selected from the group consisting of polyethylene (PE), polypropylene (PP), an ethylene copolymer, and a propylene copolymer. Alternatively, the material of the cable sheath 32 may contain polyvinyl chloride (PVC) as a main component. Among these, it is preferable that the material of the cable sheath 32 contain, as a main component, polypropylene or polyvinyl chloride because of its high flexibility and durability. Note that the main component refers to a component of at least 50 mass % of the whole of the cable sheath 32.

The terminal-attached cable 40 can be manufactured, for example, as follows. FIG. 1 illustrates a state before the terminal 10 crimps the cable 30, and FIG. 7 illustrates a state after the terminal 10 crimps the cable 30. First, as illustrated in FIG. 1, a terminal part of the cable 30 is inserted into the connection part 11 of the terminal 10. This causes the conductor 31 of the cable 30 to be placed on the upper surface of the bottom plate 16 of the conductor crimp part 14 and causes the part of the cable 30 with the cable sheath 32 to be placed on the upper surface of the bottom plate 18 of the sheath crimp part 15. Next, the connection part 11 and the terminal part of the cable 30 are pressed to deform the conductor crimp part 14 and the sheath crimp part 15. Specifically, the pair of conductor crimp pieces 17 of the conductor crimp part 14 are bent inward so as to cover the conductor 31, so that the conductor 31 is crimped so as to be in close contact with the upper surface of the bottom plate 16. Furthermore, the pair of sheath crimp pieces 19 of the sheath crimp part 15 are bent inward so as to cover the part of the cable sheath 32, so that the cable sheath 32 is crimped so as to be in close contact with the upper surface of the bottom plate 18. As above illustrated in FIG. 7, the terminal 10 crimps the cable 30, and the terminal 10 is connected to the cable 30 accordingly.

[Wire Harness]

Figure 8:
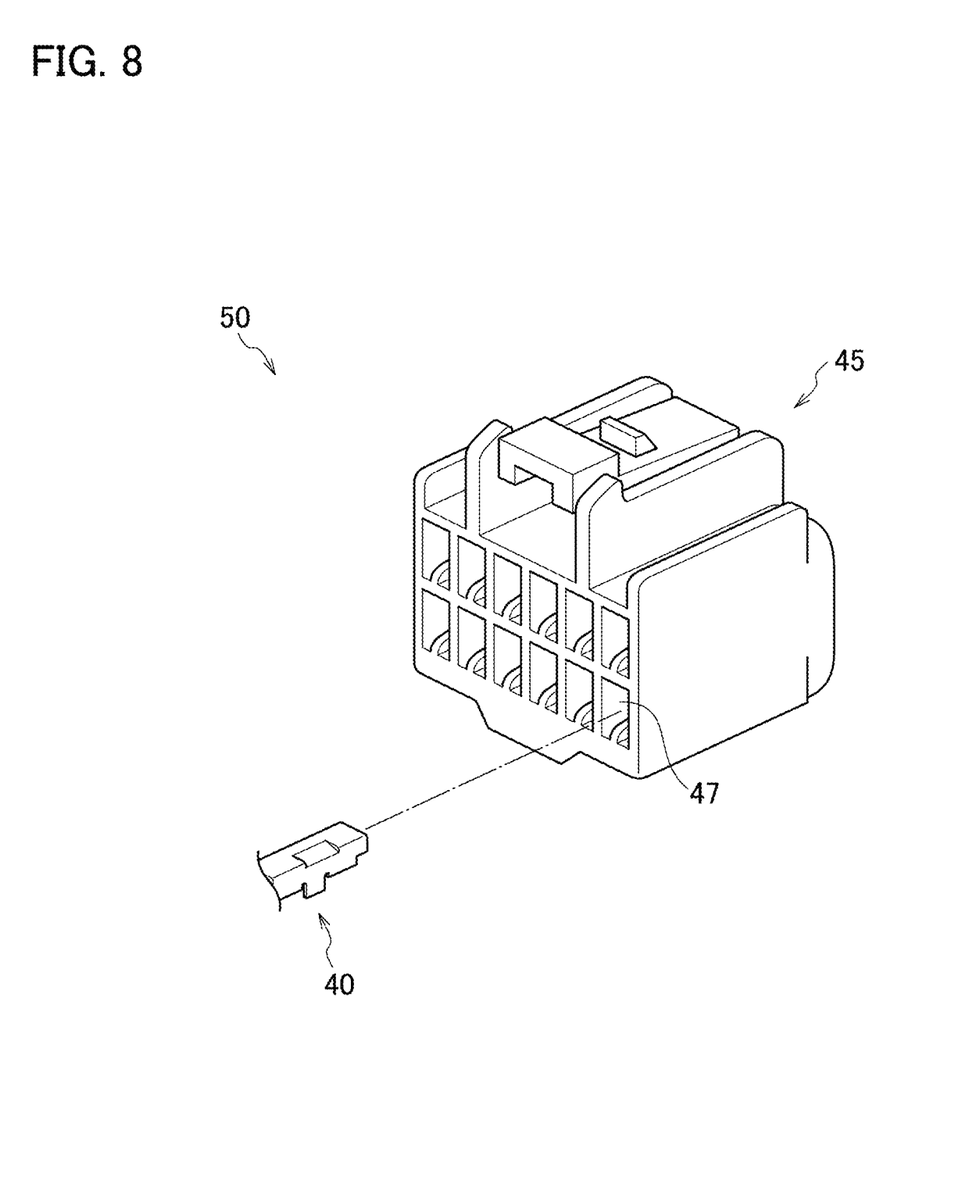
FIG. 8 is a perspective view illustrating an example of a wire harness according to the present embodiment.

As illustrated in FIG. 8, a wire harness 50 according to the present embodiment includes the terminal-attached cable 40. Specifically, the wire harness 50 according to the present embodiment includes the terminal-attached cable 40 and a connector 45.

On a backside of the connector 45, a plurality of mating terminal receiving parts (not illustrated) by which mating terminals (not illustrated) are received are provided. On a front side of the connector 45, a plurality of cavities 47 by which the terminal 10 of the terminal-attached cable 40 is received are provided. Each of the cavities 47 is provided with an approximately rectangular opening so as to receive the terminal 10 of the terminal-attached cable 40. Further, the opening of each of the cavities 47 is formed slightly larger than a cross section of the terminal 10 of the terminal-attached cable 40.

The wire harness 50 according to the present embodiment includes the terminal-attached cable 40. As described above, since the terminal 10 is excellent in mating and unmating performance and bending workability, the wire harness 50 according to the present embodiment is suitably applicable to any places such as hybrid vehicles and electric vehicles.

The terminal 10, the terminal-attached cable 40, and the wire harness 50 according to the present embodiment have been described above; however, the present embodiment is not limited to the above embodiment and is applicable to, for example, a charging cable including the terminal 10. Since such a charging cable is repeatedly mated and unmated, for example, in an electric vehicle, and the cable is crimped, the provision of the terminal 10 allows a suitable use of the charging cable.

Example

A more detailed description will be given below of the present embodiment with reference to examples and comparative examples; however, the present embodiment is not limited to these examples.

(Pretreatment)

First, pretreatment was performed on a base to be plated. Specifically, the base was alkali-degreased, immersed in sulfuric acid with a 10 percent concentration for 2 minutes, and washed with water. Note that, as the base, a C 1020-H copper plate specified in JIS H3100:2012 (copper and copper alloy sheets, plates and strips) was used.

(Formation of Silver Strike Plating Layer)

Next, a silver strike plating layer was formed on the base. The silver strike plating layer is an underlayer. Specifically, the base was immersed in a plating bath and subjected to constant current electrolysis using a DC stabilized power supply under conditions of a current density of 2.5 A/dm$^2$, an electrolysis time of 15 seconds, and a plating bath temperature of 25° C. During the constant current electrolysis, for appropriate agitation, the plating bath was shaken, and jet flow was generated in the plating bath. After the electrolysis, the base was taken out of the plating bath and washed with water. As a result, a substrate having a silver strike plating layer formed on the entire surface of the base was obtained. Note that the plating bath included silver cyanide of 4.2 g/L and potassium cyanide of 80 g/L. Further, a thickness of the silver strike plating layer was 0.3 μm. Further, the stabilized DC power supply used was PA18-5B manufactured by TEXIO TECHNOLOGY CORPORATION.

(Preparation of Substrate for Connection Part)

A first plating layer was formed on the substrate (first base) having the silver strike plating layer formed thereon. Specifically, the substrate having the silver strike plating layer formed thereon was immersed in a plating bath and subjected to constant current electrolysis using a DC stabilized power supply. Conditions of the constant current electrolysis had, for example, a current density of 3 A/dm$^2$, an electrolysis time of 20 minutes, and a plating bath temperature of 35° C. in Example 1. During the constant current electrolysis, for appropriate agitation, the plating bath was shaken, and jet flow was generated in the plating bath. After the electrolysis, the base was taken out of the plating bath and washed with water. Note that the electrolysis time was adjusted to form the plating layer having a thickness of 20 μm. The stabilized DC power supply used was PA18-5B manufactured by TEXIO TECHNOLOGY CORPORATION.

(Preparation of Substrate for Crimp Part)

A second plating layer was formed on the substrate (second base) having the silver strike plating layer formed thereon. Specifically, the substrate having the silver strike plating layer formed thereon was immersed in a plating bath and subjected to constant current electrolysis using a DC stabilized power supply. Conditions of the constant current electrolysis had, for example, a current density of 1.5 A/dm$^2$, an electrolysis time of 6 minutes, and a plating bath temperature of 20° C. in Example 1. During the constant current electrolysis, for appropriate agitation, the plating bath was shaken, and jet flow was generated in the plating bath. After the electrolysis, the base was taken out of the plating bath and washed with water. The electrolysis time was adjusted to form the plating layer having a thickness of 2 μm. The stabilized DC power supply used was PA18-5B manufactured by TEXIO TECHNOLOGY CORPORATION.

[Evaluation]

With the substrate for the connection part and the substrate for the crimp part prepared as described above used as test samples, evaluation was performed by the following method. Table 1 shows evaluation results of the substrate for the connection part, and Table 2 shows evaluation results of the substrate for the crimp part.

(Composition)

The composition of the first plating layer in the connection part and the composition of the second plating layer in the crimp part were specified by analyzing the test samples thus obtained with a scanning electron microscope (SEM)—energy dispersive X-ray spectroscopy (EDX).

(Vickers Hardness)

The Vickers hardness was evaluated by measuring, in accordance with JIS Z2244:2009, the surface of the substrate for the connection part and the surface of the substrate for the crimp part using a micro hardness tester DUH-211 manufactured by SHIMADZU CORPORATION. Note that the test temperature was 25° C., and the test force was 3 gf.

(Wear Resistance)

The wear resistance was evaluated by a sliding test. The sliding test was performed using a sliding test apparatus CRS-B1050 manufactured by Yamasaki Seiki Kenkyusho, Inc. Note that, for the sliding test, a measurement point was the surface of the substrate for the connection part, the number of times of sliding was 500, a sliding width was 5 mm, a sliding speed was 3 mm/s, a contact load was 2N (constant), and an indent shape was R=1 mm. Then, a case where a wear depth after the sliding test was equal to or less than 10 μm was evaluated to be "good", and a case where the wear depth more than 10 μm was evaluated to be "poor".

(Cracking in Crimp Part)

Cracking in the crimp part was evaluated by subjecting the substrate for the crimp part to a W-bending test. The W-bending test was performed in accordance with the provisions of JIS H3100:2018 (copper and copper alloy sheets, plates and strips). Note that an angle of a tip of a convex portion of a jig for W-bending test is 90°.

TABLE 1

| | | Connection part | | |
| --- | --- | --- | --- | --- |
| | | | Wear resistance | |
| | Material | Vickers hardness (Hv) | Depth of wear (μm) | Evaluation |
| Example 1 | 76 wt % Ag - 24 wt % Sn plating | 282 | 7.8 | good |
| Example 2 | 60 wt % Ag - 40 wt % Cu plating | 255 | 9.0 | good |
| Example 3 | 90 wt % Ag - 10 wt % Pd plating | 260 | 8.8 | good |
| Example 4 | 73 wt % Ag - 27 wt % Sn plating | 320 | 6.2 | good |
| Example 5 | 74 wt % Ag - 26 wt % Sn plating | 297 | 7.3 | good |

TABLE 1-continued

|  | | Connection part | | |
|---|---|---|---|---|
|  | | | Wear resistance | |
|  | Material | Vickers hardness (Hv) | Depth of wear (μm) | Evaluation |
| Example 6 | 74 wt % Ag - 26 wt % Sn plating | 300 | 6.7 | good |
| Example 7 | 77 wt % Ag - 23 wt % Sn plating | 350 | 5.8 | good |
| Example 8 | 75 wt % Ag - 25 wt % Sn plating | 310 | 6.5 | good |
| Example 9 | 82 wt % Ag - 18 wt % Sn plating | 250 | 9.3 | good |
| Example 10 | 68 wt % Ag - 32 wt % Sn plating | 260 | 8.6 | good |
| Comparative Example 1 | 76 wt % Ag - 24 wt % Sn plating | 280 | 7.8 | good |
| Comparative Example 2 | 98 wt % Ag - 2 wt % Sb plating | 220 | 11.2 | poor |
| Comparative Example 3 | 98 wt % Ag - 2 wt % Sb plating | 221 | 11.2 | poor |

TABLE 2

|  | | Crimp part | |
|---|---|---|---|
|  | Material | Vickers hardness (Hv) | Cracking in crimp part Evaluation |
| Example 1 | 98 wt % Ag - 2 wt % Sb plating | 220 | good |
| Example 2 | 98 wt % Ag - 2 wt % Sb plating | 216 | good |
| Example 3 | 98 wt % Ag - 2 wt % Sb plating | 222 | good |
| Example 4 | 98.4 wt % Ag - 1.6 wt % Sb plating | 200 | good |
| Example 5 | 98.8 wt % Ag - 1.2 wt % Sb plating | 180 | good |
| Example 6 | 99.2 wt % Ag - 0.8 wt % Sb plating | 130 | good |
| Example 7 | 99 wt % Ag - 1 wt % Sb plating | 150 | good |
| Example 8 | Ag plating | 100 | good |
| Example 9 | Ag plating | 80 | good |
| Example 10 | 99 wt % Ag - 1 wt % Sb plating | 150 | good |
| Comparative Example 1 | 50 wt % Ag - 50 wt % Sn plating | 282 | poor |
| Comparative Example 2 | 98 wt % Ag - 2 wt % Sb plating | 218 | good |
| Comparative Example 3 | 76 wt % Ag - 24 wt % Sn plating | 284 | poor |

From the results in Table 1 and Table 2, the test samples of Examples 1 to 10 have a Vickers hardness of 250 Hv or more at the connection part and have a Vickers hardness of less than 225 Hv at the crimp part. Therefore, satisfactory evaluation results were obtained for the wear resistance and the cracking in the crimp part. On the other hand, in the test samples of Comparative Examples 1 to 3, either of the Vickers hardnesses of the connection part and the crimp part does not satisfy a predetermined requirement. Therefore, a sufficient evaluation result failed to be obtained for at least one of the wear resistance and the cracking in the crimp part.

As described above, the present embodiment has been described with reference to the examples and the comparative examples; however, the present embodiment is not limited to such examples, and various modifications can be made within the scope of the present embodiment.

What is claimed is:

1. A terminal comprising:
a connection part electrically connectable to a mating terminal; and
a crimp part capable of crimping a cable, wherein
the connection part includes a first base having electrical conductivity, and a first plating layer that covers the first base, has a Vickers hardness of 250 Hv or more, and contains silver alloy containing silver,
the crimp part includes a second base having electrical conductivity, and a second plating layer that covers the second base, has a Vickers hardness of less than 225 Hv, and contains either silver or silver alloy containing silver, and
the crimp part includes no plating layer containing silver alloy containing silver and having a Vickers hardness of 250 Hv or more.

2. The terminal according to claim 1, wherein
the silver alloy contained in the first plating layer is alloy containing silver and at least one metal selected from the group consisting of tin, copper, palladium, bismuth, indium, and antimony.

3. The terminal according to claim 1, further comprising an underlayer that is arranged at least one between the first base and the first plating layer and between the second base and the second plating layer, has a thickness of from more than 0 μm to 3 μm or less, and contains at least one metal selected from the group consisting of nickel, copper, and silver.

4. The terminal according to claim 1, wherein
the connection part further includes a silver layer arranged on an outermost surface and formed of silver.

5. The terminal according to claim 1, wherein
a part other than the connection part or the crimp part includes no plating layer formed of at least one of a material forming the first plating layer and a material forming the second plating layer.

6. A terminal-attached cable comprising the terminal according to claim 1.

7. A wire harness comprising the terminal-attached cable according to claim 6.

8. A terminal comprising:
a connection part electrically connectable to a mating terminal; and a crimp part capable of crimping a cable, wherein
the connection part includes a first base having electrical conductivity, and a first plating layer that covers the first base, has a Vickers hardness of 250 Hv or more, and contains silver alloy containing silver,
the crimp part includes a second base having electrical conductivity, and a second plating layer that covers the second base, has a Vickers hardness of less than 225 Hv, and contains either silver or silver alloy containing silver, and
the terminal further comprising an underlayer that is arranged at least one between the first base and the first plating layer and between the second base and the second plating layer, has a thickness of from more than 0 μm to 3 μm or less, and contains at least one metal selected from the group consisting of nickel, copper, and silver.

9. A terminal comprising:
a connection part electrically connectable to a mating terminal; and
a crimp part capable of crimping a cable, wherein
the connection part includes a first base having electrical conductivity, and a first plating layer that covers the first base, has a Vickers hardness of 250 Hv or more, and contains silver alloy containing silver,
the crimp part includes a second base having electrical conductivity, and a second plating layer that covers the second base, has a Vickers hardness of less than 225 Hv, and contains either silver or silver alloy containing silver, and
a part other than the connection part or the crimp part includes no plating layer formed of at least one of a material forming the first plating layer and a material forming the second plating layer.

\* \* \* \* \*